(12) United States Patent
Kurkure et al.

(10) Patent No.: US 9,064,447 B2
(45) Date of Patent: Jun. 23, 2015

(54) METHODS AND DEVICES FOR FILTERING AND DISPLAYING DATA

(75) Inventors: Uday Kurkure, Los Altos Hills, CA (US); Sunil Satnur, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 255 days.

(21) Appl. No.: 13/324,569

(22) Filed: Dec. 13, 2011

(65) Prior Publication Data

US 2013/0147827 A1 Jun. 13, 2013

(51) Int. Cl.
*G09G 5/14* (2006.01)
*G06F 3/14* (2006.01)

(52) U.S. Cl.
CPC .. *G09G 5/14* (2013.01); *G06F 3/14* (2013.01); *G09G 2360/121* (2013.01); *G09G 2370/022* (2013.01); *G09G 2370/042* (2013.01); *G09G 2370/10* (2013.01)

(58) Field of Classification Search
CPC .................................. G09G 5/02; G06T 19/00
USPC ......................................................... 345/589
See application file for complete search history.

(56) References Cited

U.S. PATENT DOCUMENTS

| | | | |
|---|---|---|---|
| 6,594,682 B2 * | 7/2003 | Peterson et al. | 718/102 |
| 8,166,261 B1 * | 4/2012 | Cremelie et al. | 711/161 |
| 2005/0270302 A1 | 12/2005 | Weast | |
| 2007/0080830 A1 * | 4/2007 | Sacks | 340/995.1 |
| 2008/0181498 A1 * | 7/2008 | Swenson et al. | 382/173 |
| 2009/0003578 A1 | 1/2009 | Jain et al. | |
| 2010/0045594 A1 * | 2/2010 | Jenks et al. | 345/156 |
| 2010/0250858 A1 * | 9/2010 | Cremelie et al. | 711/136 |
| 2011/0018894 A1 | 1/2011 | Matskewich et al. | |

OTHER PUBLICATIONS

Luke Jefferson, Richard Harvey, "An Interface to Support Color Blind Computer Users", CHI 2007 Proceedings, color/Blind Apr. 28-May 3, 2007 • San Jose, CA, USA.*
www.vischeck.com/daltonize (last accessed Dec. 9, 2011).

\* cited by examiner

*Primary Examiner* — Devona Faulk
*Assistant Examiner* — Jin Ge

(57) ABSTRACT

Described herein, a computing device includes a memory including a display cache configured to store display sections, a filter module configured to filter a display section to create a filtered display section, and a display module. The display module is configured to determine whether a first filtered display section corresponding to a first display section is stored within the display cache, retrieve the first filtered display section from the display cache if the first filtered display section is determined to be stored within the display cache, and cause the first filtered display section to be displayed within the display area.

23 Claims, 6 Drawing Sheets

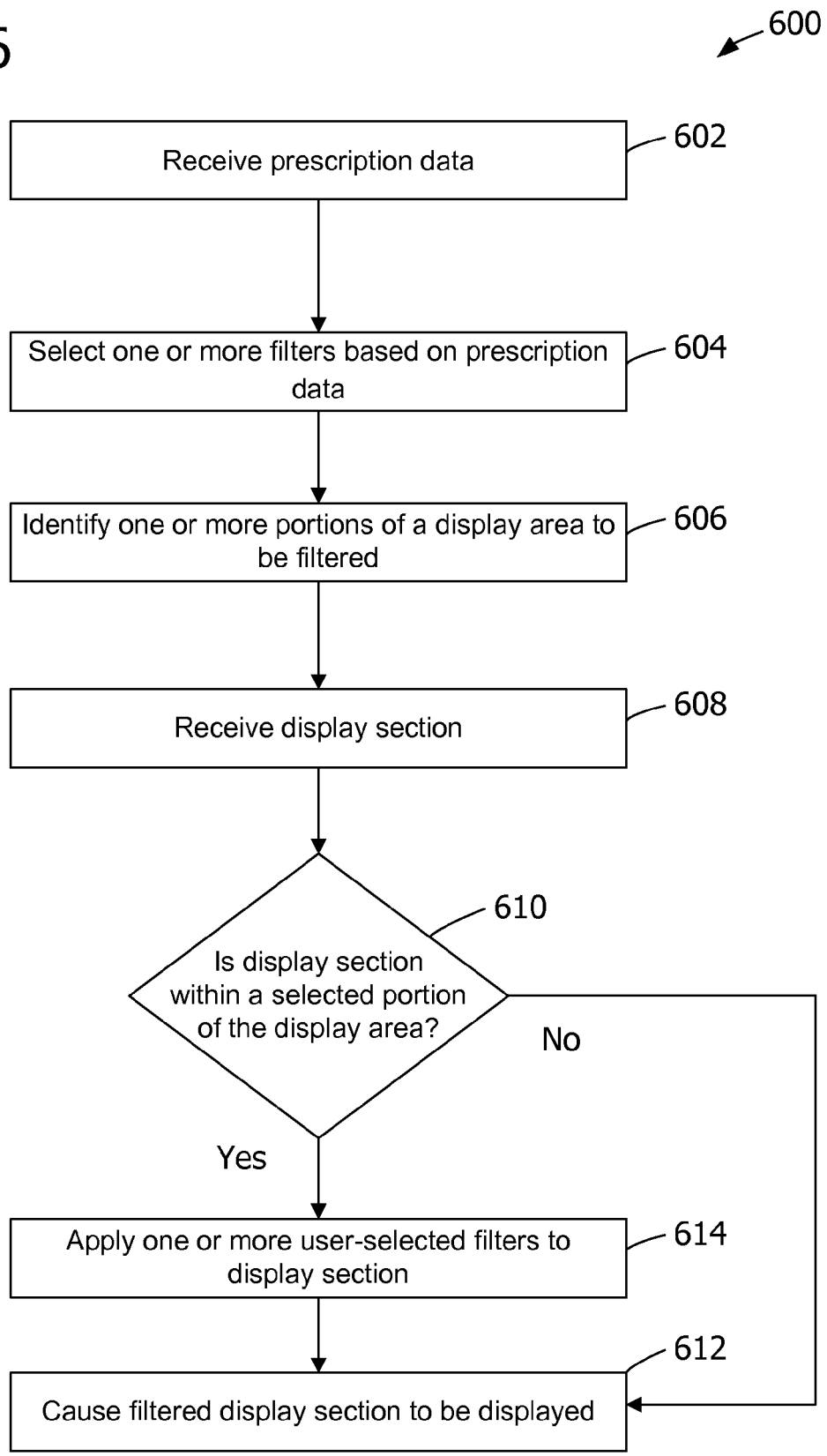

METHODS AND DEVICES FOR FILTERING AND DISPLAYING DATA

BACKGROUND

At least some users of computing devices may experience difficulty in distinguishing between certain colors and/or may be unable to properly identify certain colors. For example, some users may suffer from dichromacy, anomalous trichromacy, or rod monochromacy (also known as suffering from "color blindness"). As a result of color blindness, a user may not receive important information that is displayed in one or more colors that the user is unable to perceive.

To compensate for color blindness, a user may wear a tinted lens over one or both eyes to enhance color perception. However, such lenses may be uncomfortable and may be difficult to adjust during use. At least some computers include an accessibility mode in which the colors displayed on a computer display are transformed to a set of colors that are more easily identified by the user. However, these accessibility modes may undesirably consume significant processor and/or display adapter resources.

SUMMARY

Embodiments described herein include a computing device that filters data and displays the data. The computing device includes a presentation device including a display area for displaying data, a processor, and a network communication interface for receiving a plurality of display sections, wherein each display section includes data to be displayed in a portion of the display area. The computing device also includes memory including a display cache configured to store the display sections, a filter module configured to filter a display section to create a filtered display section, and a display module. The display module is configured to determine whether a first filtered display section corresponding to a first display section is stored within the display cache, retrieve the first filtered display section from the display cache if the first filtered display section is determined to be stored within the display cache, and cause the first filtered display section to be displayed for viewing on the display area.

BRIEF DESCRIPTION OF THE DRAWINGS

FIG. 6 is a flowchart of an exemplary method for simulating use of a prescription lens that may be used with the system shown in FIG. 2.

DETAILED DESCRIPTION

Figure 1:
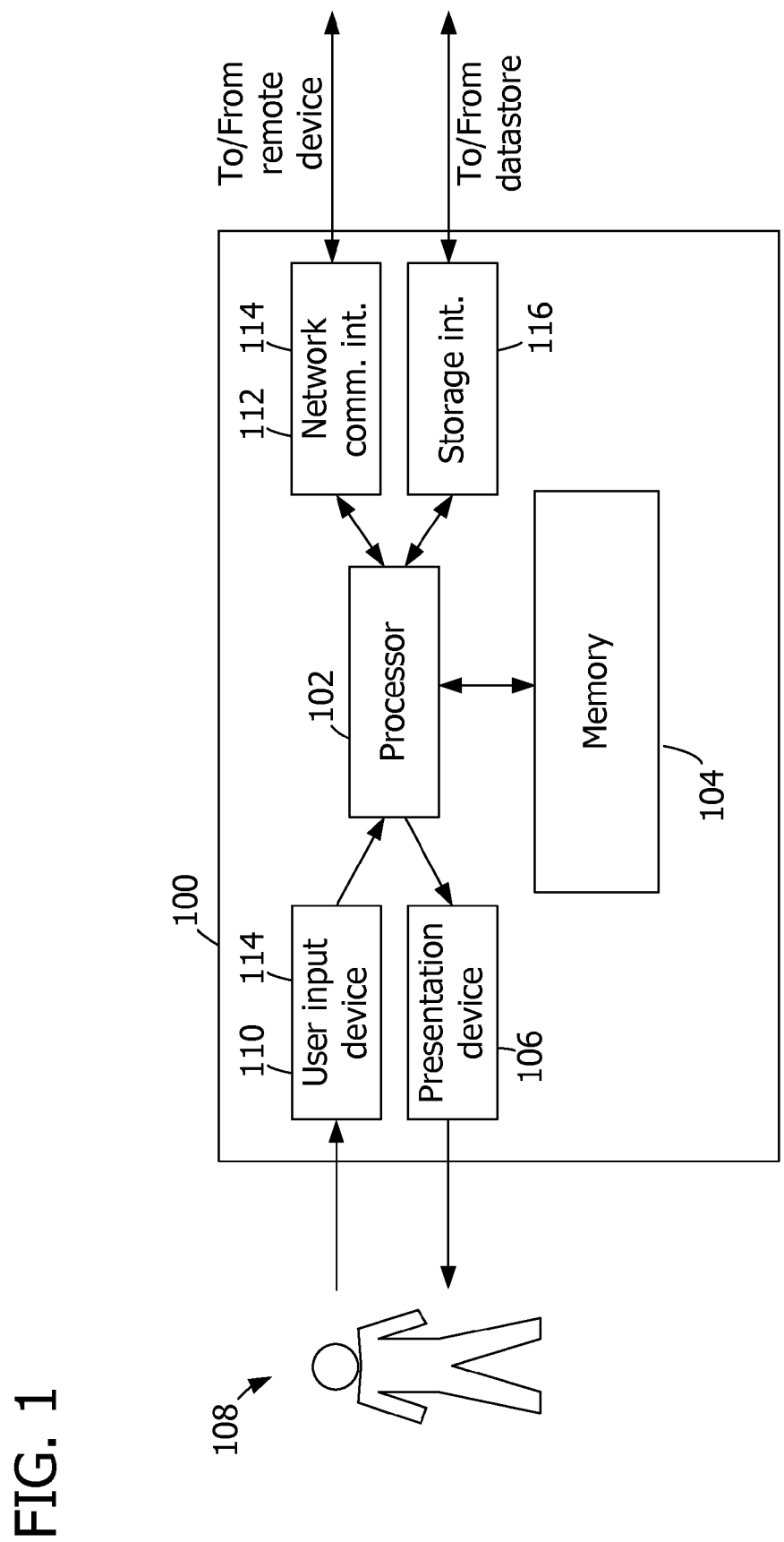
FIG. 1 is a block diagram of an exemplary computing device.

In one embodiment, a client computing device (client) includes a presentation device that includes a display area for displaying data, a processor, and a network communication interface for receiving a plurality of display sections from a server computing device (server). Each display section includes data to be displayed in a portion of the display area. The computing device also includes a memory including a display cache configured to store the display sections, a filter module configured to filter a display section to create a filtered display section, and a display module. The display sections and the filtered display sections are stored in the display cache for later retrieval.

In operation, the server transmits fingerprints of the display sections to the client. When a fingerprint is received from the server, the display module determines whether the display section corresponding to the fingerprint is already stored in the display cache by searching for the fingerprint within an index of the display cache. If the display module locates the fingerprint, the display module retrieves the corresponding display section from the cache. However, if the display module does not locate the fingerprint in the display cache index, the display module receives the display section from the server.

When the display section is received from the server or is retrieved from the display cache, the filter module determines whether a filter should be applied to the display section. If a filter should be applied, the display module determines whether a filtered version of the display section (i.e., a filtered display section) is already stored in the display cache. Specifically, the display module determines whether the fingerprint of the display section is associated with the filtered display section and/or is associated with a fingerprint of the filtered display section. If the display module determines that the filtered display section is stored within the display cache, the display module retrieves the filtered display section from the display cache and causes the filtered display section to be displayed on the presentation device. However, if the filtered display section is not stored within the display cache, the display section is filtered using one or more filters to create a filtered display section. The filtered display section created by the filter module is stored in the display cache and is displayed on the presentation device.

Accordingly, as described herein, the client can display the display area efficiently by utilizing an indexed display cache to store and retrieve display sections. In addition, the client can display filtered display sections efficiently by storing and retrieving the sections using the display cache, rather than having to apply one or more filters to a display section each time the display section is received. Storing and displaying filtered display sections facilitates efficiency because, in comparison to executing filtering algorithms each time a filtered display is to be used, the client processor utilization is reduced by reducing the number of filtering algorithms used to create and display the filtered display sections. In addition, storing display sections in the display cache lowers a bandwidth utilization for the network connection between the client and the server in comparison to continuously receiving each display section from the server.

In addition, each client may include different filters and may designate different portions of the display area for filtering with respect to each other client. Accordingly, a user who suffers from a color perception deficiency (e.g., a user who is "color blind") can customize the display of the display area by identifying one or more portions of the display area to be filtered and selecting one or more filters to facilitate distinguishing colors therein. Each client can therefore be tailored to a particular user's preference.

FIG. 1 is a block diagram of an exemplary computing device 100. Computing device 100 includes a processor 102 for executing instructions. In some embodiments, computer-executable instructions are stored in a memory 104 for performing one or more of the operations described herein.

Memory 104 is any device allowing information, such as executable instructions, configuration options (e.g., threshold values), and/or other data, to be stored and retrieved. For example, memory 104 may include one or more computer-readable storage media, such as one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscopic sensor, an accelerometer, a position detector, and/or an audio input device. A single component, such as a touch screen, may function as both an output device of presentation device 106 and user input device 110.

Computing device 100 also includes a communication interface 112, which enables computing device 100 to communicate with a remote device (e.g., another computing device 100) via a communication medium, such as a wired or wireless packet network. For example, computing device 100 may transmit and/or receive data via communication interface 112. User input device 110 and/or communication interface 112 may be referred to as an input interface 114 and may be configured to receive information, such as configuration options (e.g., threshold values), from a user.

In some embodiments, computing device 100 may be a server computing device 100 (server) or a client computing device 100, such as a desktop computer. In some embodiments where computing device 100 is a server, computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
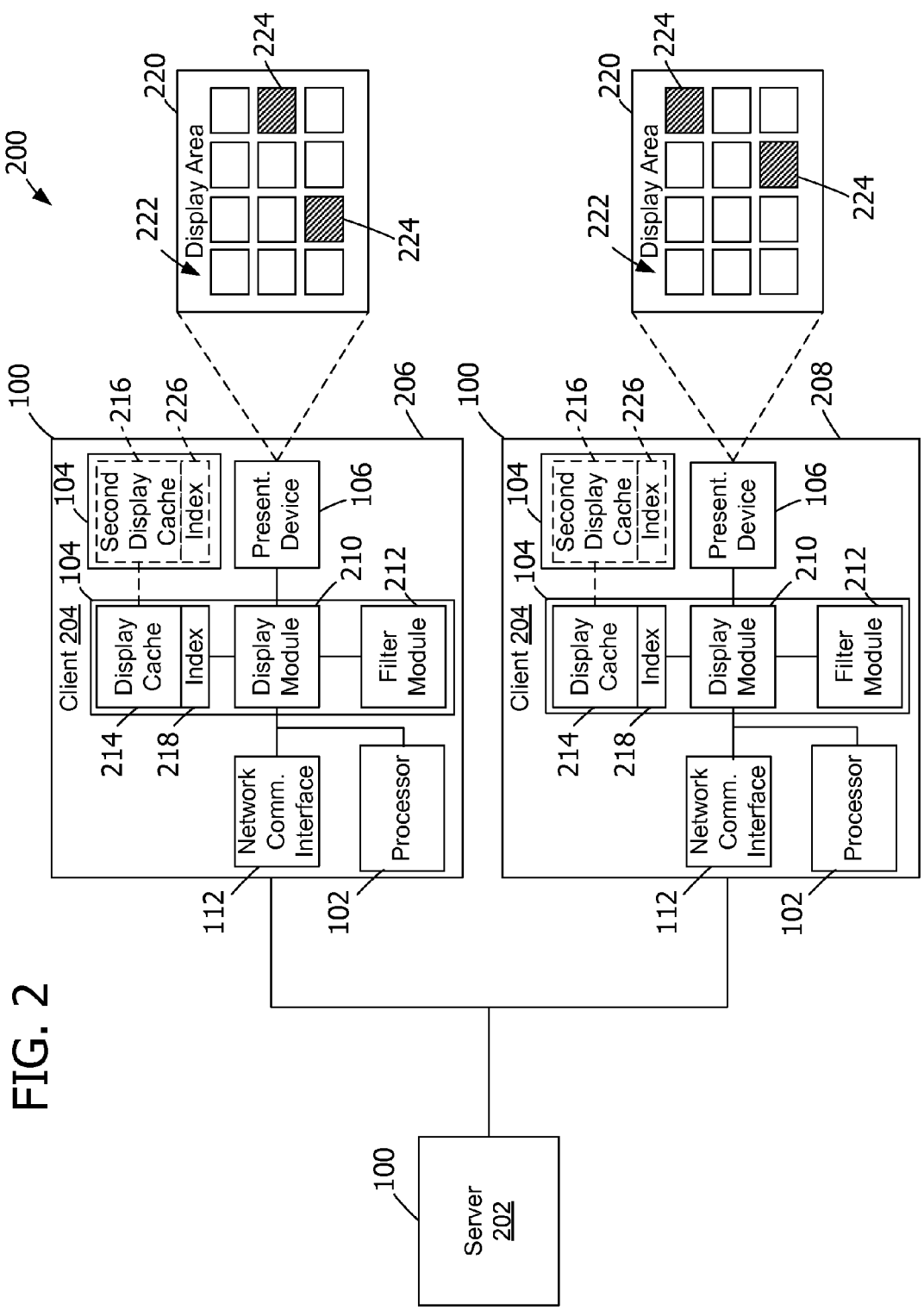
FIG. 2 is a block diagram of an exemplary system of computing devices shown in FIG. 1.

FIG. 2 is a block diagram of an exemplary system 200 of computing devices 100 that includes a server 202 and a plurality of clients 204, such as a first client 206, and a second client 208. It should be understood that while system 200 is illustrated in FIG. 2 as including three computing devices 100 (i.e., server 202, first client 206, and second client 208), system 200 may include any number of computing devices 100, including any number of servers 202 and clients 204. Additionally, while server 202 and clients 204 are described herein as computing devices 100, it should be recognized that server 202 and/or clients 204 may be, or may include, virtual machines (VMs) that are executing in conjunction with a virtualization software layer of one or more computing devices 100. For example, server 202 may instantiate and execute a plurality of VMs within the virtualization software layer, and clients 204 may access the VMs remotely through network communication interface 112. Accordingly, server 202 may provide one or more remote desktops to clients 204 through a network (e.g., using network communication interfaces 112 of server 202 and clients 204).

Network communication interface 112 of each client 204 is communicatively coupled to a display module 210. Display module 210 is communicatively coupled to a filter module 212, a display cache 214, and presentation device 106. In one embodiment, display module 210 is communicatively coupled to a second display cache 216 and/or to any other memory that enables client 204 to function as described herein.

As described herein, each module is a software program module that includes a plurality of computer-executable instructions stored in a memory, such as memory 104. The modules are executed by a processor, such as processor 102 to perform the functions described herein. In addition, as described herein, each cache is a portion of a memory, such as memory 104, that enables data to be stored. In one embodiment, each cache is organized using an index 218 to facilitate quickly identifying and accessing desired data.

Display module 210 facilitates displaying data, such as graphical and textual data, to a user using presentation device 106. More specifically, display module 210 receives data representative of one or more screens, or display areas 220, and causes the display areas 220 to be displayed on presentation device 106. As used herein, the term "display area" refers to a viewable area of a display, such as presentation device 106. Display areas 220 may include one or more remote (or virtual) desktops of one or more computing devices 100 or virtual machines, views of applications, windows, and/or any other data to be displayed on presentation device 106. In one embodiment, the data representative of display area 220 is partitioned and transmitted by server 202 to client 204 in a series of display sections 222. Display module 210 causes each display section 222 to be displayed on presentation device 106 such that display area 220 is formed by the aggregation of display sections 222.

In one embodiment, display sections 222 of display area 220 are arranged in a grid within presentation device 106 such that each display section 222 is associated with a specific portion of, or location within, the grid. After an initial display area 220 is received from server 202 and displayed on presentation device 106, server 202 may determine that only certain portions of the display area 220 have changed, or need to be updated, over time. Accordingly, server 202 may transmit only the display sections 222 corresponding to the changed portions of display area 220 to client 204 for updating display area 220 therewith.

Filter module 212 enables color transformations of display sections 222, for example, to facilitate enabling a user with one or more color perception deficiencies to view the data contained within display area 220. For example, a user may be "color blind" such that the user may not be able to accurately recognize one or more colors displayed in display area 220. Filter module 212 enables a color transformation mode to be activated in which one or more color transformations or filters are applied to the data contained within one or more display sections 222. In one embodiment, the filters cause one or more colors of a display section 222 to be changed to a different color. The filters can be selected and/or defined by a user, by a remote device such as server 202, and/or by clients 204. In addition, the user can enable or disable the color transformation mode to enable or disable the filtering or transformation of display sections 222.

Display cache 214 stores display data, such as display sections 222, received from server 202. In addition, display cache 214 stores display sections 222 that have a color transformation or filter applied (hereinafter referred to as "filtered display sections 224"). Each display section 222 and/or filtered display section 224 is indexed within display cache 214 by an index 218. Specifically, index 218 includes a unique fingerprint associated with each display section 222 and/or filtered display section 224 stored within display cache 214. In one embodiment, the fingerprint is a value output from executing a hash algorithm (hereinafter referred to as a "hash value" or a "hash") on the data included within each display section 222 and/or each filtered display section 224 stored within cache 214. Alternatively, the fingerprints may include any other identifier of display sections 222 and/or filtered display sections 224 that enables system 200 to function as described herein.

In one embodiment, client 204 includes a second display cache 216 for storing filtered display sections 224. In such an embodiment, filtered display sections 224 stored in second display cache 216 are linked, or associated, with unfiltered display sections 222 stored in display cache 214. In a further embodiment, second display cache 216 may include a second index 226 for storing fingerprints for filtered display sections 224. The fingerprints of second display cache 216 may be linked, or associated with, the fingerprints of display cache 214.

During operation, server 202 transmits fingerprints of display sections 222 for one or more display areas 220, such as one or more remote desktop screens, to client 204. Network communication interface 112 receives each fingerprint and transmits each fingerprint to display module 210. Display module 210 determines whether display section 222 associated with the fingerprint is stored within display cache 214, for example, by determining whether the fingerprint is within index 218. If the fingerprint is within index 218, display module 210 retrieves display section 222 associated with the fingerprint from display cache 214, rather than from server 202. However, if display module 210 determines that the fingerprint is not within index 218 (indicating that display section 222 is not within display cache 214), display module 210 requests display section 222 from server 202. Server 202 transmits display section 222 to client 204, and display module 210 stores display section 222, and a fingerprint of display section 222, within display cache 214. Display module 210 causes display section 222 to be displayed by presentation device 106. Server 202 continues transmitting fingerprints for other display sections 222 in a similar manner. In one embodiment, after an initial display area 220 is displayed, server 202 only transmits the display sections 222 corresponding to portions of display area 220 that have changed.

If a color transformation mode is enabled, filter module 212 determines whether each display section 222 corresponds to a portion of display area 220 that has a color transformation or filter defined (hereinafter referred to as a "filtered portion"). For example, a user may define one or more filtered portions of display area 220 to enable colors within the filtered portions to be transformed. More specifically, a filter may be applied to display sections 222 within the filtered portion to transform, or replace, the colors within the filtered portion.

If filter module 212 determines that a display section 222 corresponds to a filtered portion of display area 220, filter module 212 transmits a signal to display module 210 to determine if a filtered display section 224 corresponding to display section 222 exists within display cache 214 or second display cache 216. In one embodiment, display module 210 determines whether the fingerprint of the display section 222 is associated with a corresponding filtered display section 224 within display cache 214 or second display cache 216. If a filtered display section 224 is associated with display section 222, display module 210 retrieves filtered display section 224 from display cache 214 or second display cache 216. However, if the display section 222 is not associated with a filtered display section 224 within display cache 214 or second display cache 216, filter module 212 applies one or more filters to display section 222 to create a filtered display section 224. Filter module 212 transmits filtered display section 224 to display module 210 for storage in display cache 214 or second display cache 216. Display module 210 associates filtered display section 224 and/or a fingerprint of the filtered display section 224 with the (unfiltered) display section 222. Display module 210 causes filtered display section 224 to be displayed on presentation device 106.

It should be recognized that each client may have different filters defined for display area 220 and/or may have different portions (or no portions) of display area 220 defined for filtering. Therefore, first client 206 may have a first filter, or a first set of filters, defined for a first portion (or portions) of display area 220, and second client 208 may have a second filter, or a second set of filters, defined for a second portion (or portions) of display area 220. Accordingly, system 200 enables users to customize the color transformations performed by clients 204 to accommodate the individual needs or desires of each user.

Figure 3:
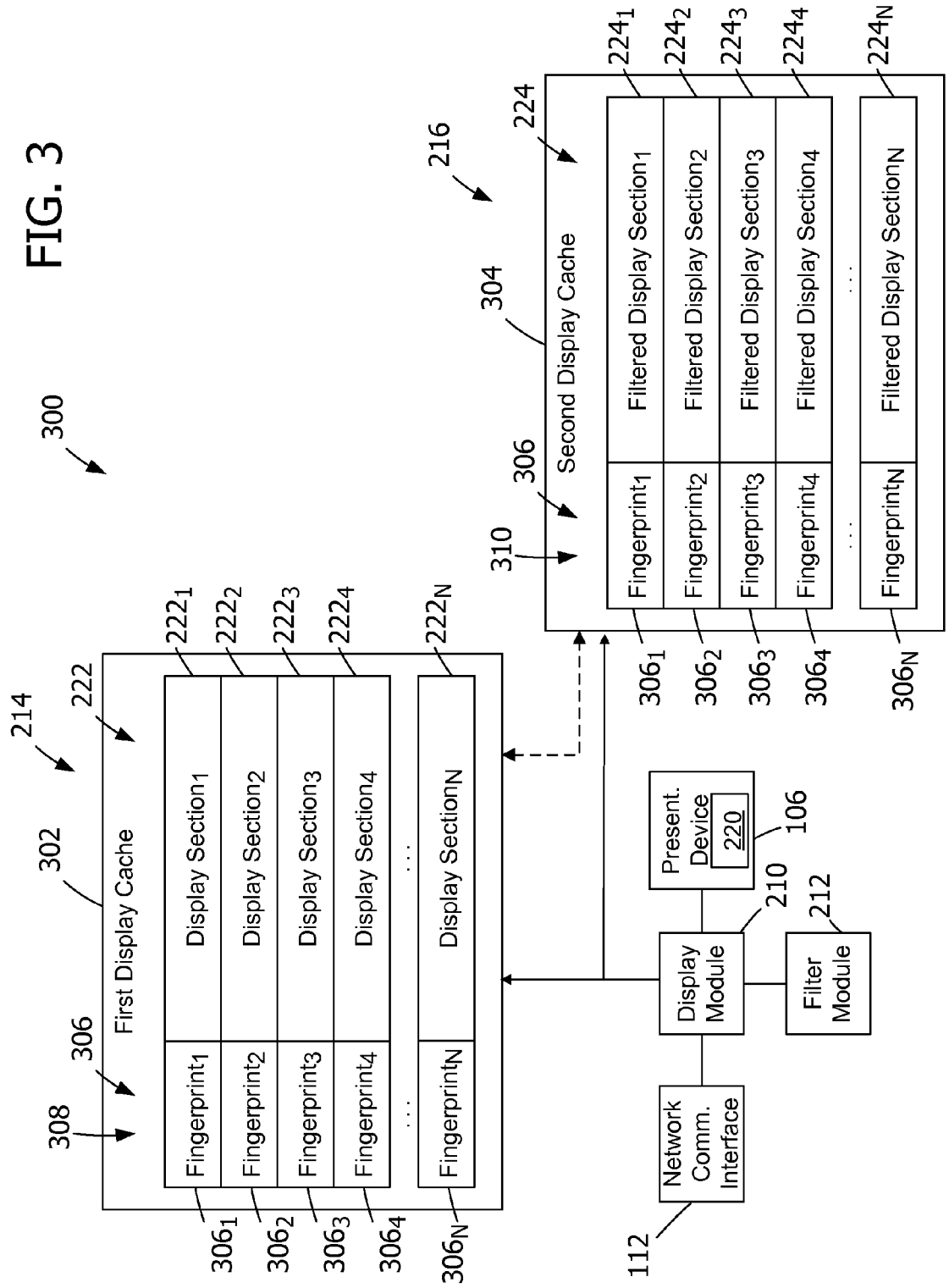
FIG. 3 is a block diagram of an exemplary cache system that may be used with the system shown in FIG. 2.

FIG. 3 is a block diagram of an exemplary cache system 300 of a client computing device (client) that may be used with system 200 (shown in FIG. 2). Similar components are labeled in FIG. 3 with the same reference numerals used in FIG. 2. Cache system 300 includes a first display cache 302 and a second display cache 304. In one embodiment, first display cache 302 is display cache 214, and second display cache 304 is second display cache 216.

First display cache 302 includes a plurality of display sections 222, such as display sections $222_1$-$222_N$. A fingerprint 306 of each display section 222 is stored within a first index 308, and each fingerprint 306 is associated with the corresponding display section 222. Accordingly, first index 308 includes fingerprints $306_1$-$306_N$ that are associated with display sections $222_1$-$222_N$.

In addition, second display cache 304 includes a plurality of filtered display sections 224, such as filtered display sections $224_1$-$224_N$, that each correspond to a display section 222 that has been filtered by filter module 212. Each filtered display section 224 is associated with fingerprint 306 of each (unfiltered) display section 222, for example, within a second index 310 of second display cache 304. More specifically, each filtered display section 224 is associated, or linked, with a display section 222 by a fingerprint 306 of the display section 222 corresponding to the filtered display section 224. Accordingly, filtered display sections $224_1$-$224_N$ are associated with display sections $222_1$-$222_N$ by fingerprints $306_1$-$306_N$.

During operation, display section $222_1$ is received from a server computing device and is stored within first display cache 302 by display module 210. Display module 210 generates a fingerprint $306_1$ of display section $222_1$, and associates fingerprint $306_1$ with display section $222_1$ within first index 308. If display section $222_1$ is identified by filter module 212 as being located within a filtered portion of display area 220, filter module 212 generates a filtered display section $224_1$ based on display section $222_1$, for example, by applying one or more filters to display section $222_1$. Display module 210 stores filtered display section $224_1$ in second display cache 304, and associates fingerprint $306_1$ (of display section $222_1$) with filtered display section $224_1$.

In a similar manner, first display cache 302 is populated with additional display sections $222_2$-$222_N$, and a fingerprint $306_2$-$306_N$ of each display section $222_2$-$222_N$ is associated with each display section $222_2$-$222_N$. Similarly, second display cache 304 is populated with additional filtered display sections $224_2$-$224_N$, and each filtered display section $224_2$-$224_N$ is associated with fingerprint $306_2$-$306_N$ of corresponding display section $222_2$-$222_N$ that each filtered display section $224_2$-$224_N$ is based on. Accordingly, display module 210 can quickly and efficiently determine whether a filtered display section 224 exists within second display cache 304 for a particular display section 222, for example, by searching second display cache 304 for fingerprint 306 of display section 222.

It should be recognized that not every display section 222 may have a filter applied to section 222 to create a filtered display section 224. Accordingly, display area 220 may include a plurality of filtered display sections 224 and a plurality of (unfiltered) display sections 222. In addition, while cache system 300 is described herein as including first display cache 302 and second display cache 304, it should be recognized that first display cache 302 and second display cache 304 may be combined into a single display cache, or may be subdivided into additional display caches to operate in a similar manner as described herein.

Figure 4:
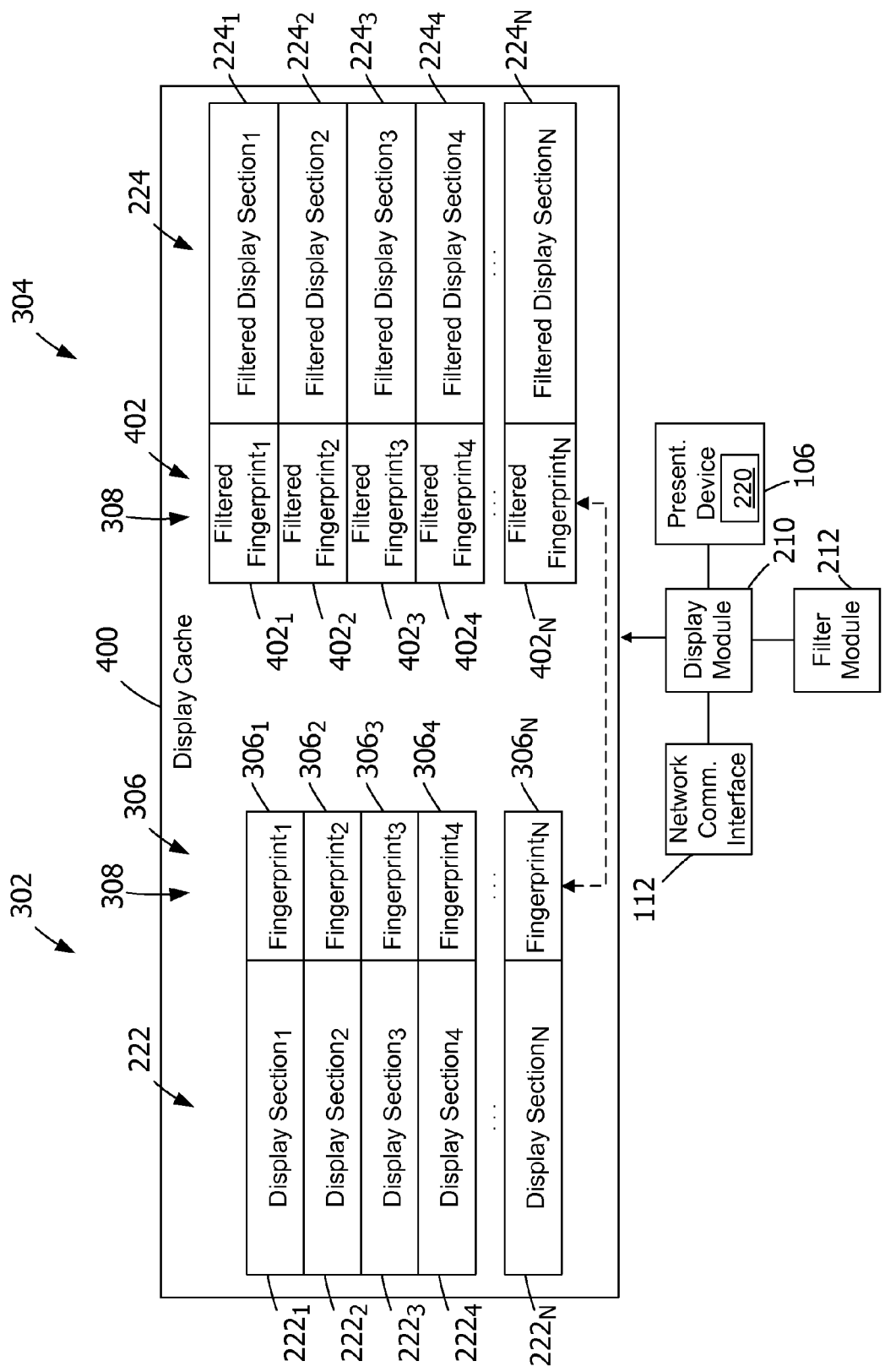
FIG. 4 is a block diagram of an exemplary display cache that may be used with the system shown in FIG. 2.

FIG. 4 is a block diagram of an exemplary display cache 400 of a client computing device (client) that may be used with system 200 (shown in FIG. 2). Similar components are labeled in FIG. 4 with the same reference numerals used in FIG. 2 and FIG. 3. In one embodiment, display cache 400 includes first display cache 302 and second display cache 304.

Display cache 400 includes display sections $222_1$-$222_N$ and associated fingerprints $306_1$-$306_N$. In addition, display cache 400 includes filtered display sections $224_1$-$224_N$ that each correspond to a display section 222 that has been filtered by filter module 212. A filtered fingerprint 402 (e.g., each of fingerprints $402_1$-$402_N$) is associated with each filtered display section 224. For example, a hash algorithm is executed on each filtered display section 224, and a resulting hash value is stored in index 308 as the filtered fingerprint 402 of the corresponding filtered display section 224.

Each filtered fingerprint 402 of a filtered display section 224 is associated with, or linked to, a fingerprint 306 of display section 222 that filtered display section 224 is based on. Accordingly, each filtered display section 224 is associated with, or linked to, a display section 222 based on the association, or linking, of fingerprint 306 and filtered fingerprint 402.

During operation, display section $222_1$ is received from a server computing device and is stored within display cache 400 by display module 210. Display module 210 generates a fingerprint $306_1$ of display section $222_1$, and associates fingerprint $306_1$ with display section $222_1$ within index 308. If display section $222_1$ is identified by filter module 212 as being located within a filtered portion of display area 220, filter module 212 generates a filtered display section $224_1$ based on display section $222_1$, for example, by applying one or more filters to display section $222_1$. Display module 210 stores filtered display section $224_1$ in display cache 400, and generates a filtered fingerprint $402_1$ for filtered display section $224_1$. Display module 210 associates fingerprint $306_1$ (of display section $222_1$) with filtered fingerprint $402_1$ (of filtered display section $224_1$) within index 308.

In a similar manner, display cache 400 is populated with additional display sections $222_2$-$222_N$, and a fingerprint $306_2$-$306_N$ of each display section $222_2$-$222_N$ is associated with each display section $222_2$-$222_N$. Similarly, display cache 400 is populated with additional filtered display sections $224_2$-$224_N$ and filtered fingerprints $402_2$-$402_N$ for each filtered display section $224_2$-$224_N$. Each filtered fingerprint $402_2$-$402_N$ is associated with fingerprint $306_2$-$306_N$ of the corresponding display section $222_2$-$222_N$ that each filtered display section $224_2$-$224_N$ is based on. Accordingly, display module 210 can quickly and efficiently determine whether a filtered display section 224 exists within display cache 400 for a particular display section 222, for example, by searching display cache 400 for fingerprint 306 of display section 222, and determining whether fingerprint 306 is associated with a filtered fingerprint 402.

Figure 5:
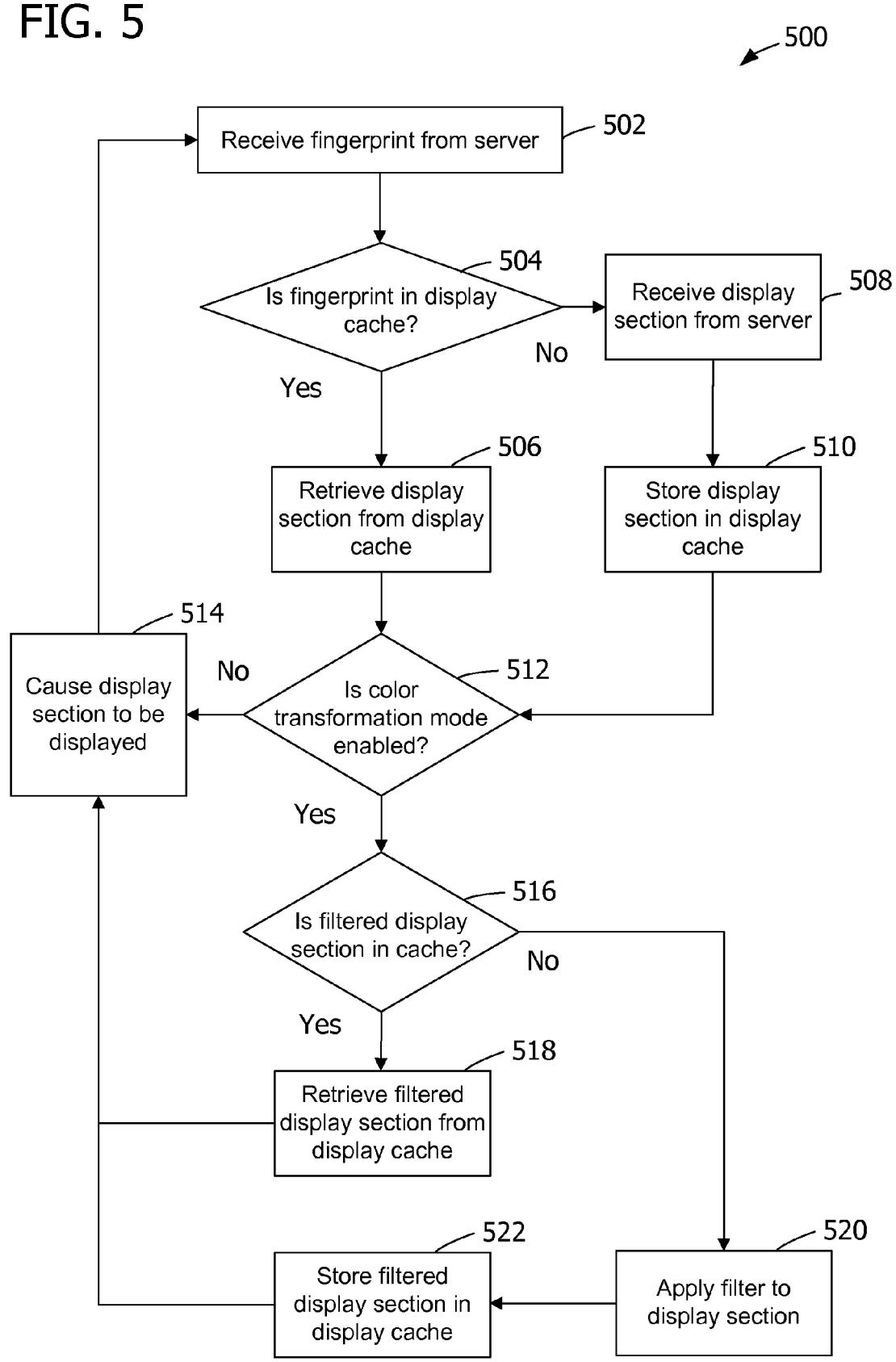
FIG. 5 is a flowchart of an exemplary method for displaying data that may be used with the system shown in FIG. 2.

FIG. 5 is a flowchart of an exemplary method 500 of displaying data that may be used with system 200 (shown in FIG. 2), cache system 300 (shown in FIG. 3), and/or display cache 400 (shown in FIG. 4). Method 500 is executed by a computing device, such as a client computing device (client). For example, a plurality of computer-executable instructions is embodied within a computer-readable medium, such as a memory of the client. The instructions, when executed by a processor, such as a processor of the client, cause the processor to execute the steps of method 500 and/or to function as described herein.

In one embodiment, the client receives 502 a fingerprint for a display section from a server computing device (server). Specifically, the server identifies a display section of a presentation device display area that has been changed or that should be updated, and transmits a fingerprint of the identified display section to the client. A display module of the client receives the fingerprint from a network communication interface and determines 504 whether the fingerprint is stored within a display cache of the client. More specifically, the display module searches an index of the display cache for the fingerprint. If the display module locates the fingerprint within the index, the display module retrieves 506 the display section associated with the fingerprint from the display cache. However, if the display module does not locate the fingerprint within the display cache, the display module determines 504 that the fingerprint and the associated display section are not stored within the display cache. The client requests the display section from the server. The client receives 508 the display section from the server and the display module stores 510 the display section in the display cache.

After the display section has been retrieved from the display cache or received from the server, the display module determines 512 whether a color transformation mode is enabled. The color transformation mode enables one or more filters, or color transformations, to be applied to one or more display sections of the display area. If the color transformation mode is not enabled, the display module causes 514 the display section to be displayed on the presentation device without being filtered. Method 500 returns to receiving 502 a fingerprint from the server for a new display section.

However, if the color transformation mode is enabled, the display module determines 516 whether a filtered display section corresponding to the received or retrieved display section is stored within the display cache. For example, the display module searches the display cache index to locate the fingerprint of the display section associated with the filtered display section. Alternatively, the display module searches the index to locate a fingerprint (e.g., a filtered fingerprint) of the filtered display section that corresponds to the fingerprint of the display section.

If the display module determines 516 that a filtered display section corresponding to the display section is stored within the display cache, the display module retrieves 518 the filtered display section from the display cache and causes 514 the filtered display section to be displayed on the presentation device (e.g., on the display area). However, if the display module determines 516 that the filtered display section corresponding to the display section is not stored within the display cache, the filter module applies 520 one or more filters to the display section received from the server or retrieved from the display cache, e.g., by executing one or more filtering algorithms on the display section. The filter or filters cause one or more colors within the display section to be changed to one or more different colors to create a filtered display section. The filtered display section and a fingerprint of the filtered display section are stored 522 in the display cache. The display module causes 514 the filtered display section to be displayed on the presentation device, and method 500 returns to receiving 502 a fingerprint from the server for a new display section.

FIG. 6 is a flowchart of an exemplary method 600 of simulating use of a prescription lens within a computing device that may be used with system 200 (shown in FIG. 2), cache system 300 (shown in FIG. 3), and/or display cache 400 (shown in FIG. 4). Method 600 is executed by a computing device, such as a client computing device (client). For example, a plurality of computer-executable instructions is embodied within a computer-readable medium, such as a memory of the client. The instructions, when executed by a processor, such as a processor of the client, cause the processor to execute the steps of method 600 and/or to function as described herein.

In one embodiment, the client receives 602 data representative of an eyeglass or lens prescription (hereinafter referred to as "prescription data") for a user. The prescription data includes, for example, one or more colors that the user is unable to identify and/or one or more colors that need to be replaced or changed to a different color within a display area of a presentation device to correct or mitigate a color perception deficiency of the user. One or more filters are selected 604 or identified, for example, by a filter module of the client based on the prescription data. For example, a red-orange filter may be selected 604 to improve a contrast between colors of the display section. In another example, if the prescription data indicates that the user has a reduced ability to distinguish between green and red colors (e.g., if the user is a deuteranope), a red filter may be selected 604 as a first filter to be applied to a display section, and a green filter may be selected 604 as a second filter to be applied to the display section. In an alternative embodiment, the filter module receives an input from a user or from a remote device identifying one or more filters to be applied, and the filter module selects 604 the identified filters.

The filter module also identifies 606 one or more portions of the display area to be filtered. In one embodiment, the filter module receives a selection of the portions of the display area to be filtered, for example, from a user or from a remote device. Alternatively, the filter module may identify 606 the portions (if any) of the display area to be filtered based on historical filtering data, based on data received from the server, and/or based on an analysis of the display area.

A display section is retrieved 608 from the display cache or is received from the server, as described above with reference to FIG. 5. The filter module determines 610 whether the display section is to be positioned within a selected portion of the display area (i.e., a portion of the display area that will be filtered). If the display section will not be positioned within the filtered portion of the display area, the display module causes 612 the (unfiltered) display section to be displayed on the presentation device. However, if the display section will be positioned within the filtered portion of the display area, the filter module applies 614 one or more filters, such as one or more filters selected 604 above, to the display section to create a filtered display section as described more fully above. The display module causes 612 the filtered display section to be displayed on the presentation device. Accordingly, the display of the filtered display sections simulates a user wearing a prescription lens, such as a prescription lens to correct or mitigate color blindness.

The server and clients as described herein may be performed by a computer or computing device. A computer or computing device may include one or more processors or processing units, system memory, and some form of computer-readable media. Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media store information such as computer-readable instructions, data structures, program modules, or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

Although described in connection with an exemplary computing system environment, embodiments of the server and clients are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the server and clients may include computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects described herein may be implemented with any number and organization of such components or modules. For example, the server and clients described herein are not limited to the specific computer-executable instructions or the specific components or modules illustrated in the figures and described herein. Other embodiments of the server and clients may include different computer-executable instructions or components having more or less functionality than illustrated and described herein.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the embodiments described herein.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the embodiments in detail, it will be apparent that modifications and variations are possible without departing from the scope of aspects of the disclosure as defined in the appended claims. As various changes could be made in the above constructions, products, and methods without departing from the scope of aspects of the embodiments, it is intended that all matter contained in the above description and shown in the accompanying drawings shall be interpreted as illustrative and not in a limiting sense.

What is claimed is:

1. A computing device comprising:
  a presentation device comprising a display area for displaying data;
  a network communication interface configured to receive a plurality of display sections, wherein each display section of the plurality of display sections includes data to be displayed in a portion of the display area;
  a processor coupled to the presentation device and to the network communication interface; and
  at least one memory coupled to the processor, the memory comprising:
    a display cache configured to store the plurality of display sections;
    a filter module executable by the processor and configured to filter at least one display section of the plurality of display sections to create a filtered display section; and
    a display module executable by the processor and configured to:
      determine that data corresponding to a first display section of the plurality of display sections is stored within the display cache;
      based on determining that data corresponding to the first display section of the plurality of display sections is stored within the display cache, determine whether the first display section corresponds to a first filtered display section that compensates for colorblindness of a colorblind user viewing the display area based on a prescription of the colorblind user;
      when it is determined that the first display section corresponds to a first filtered display section, determine whether the first filtered display section is stored within the display cache,
      when it is determined that the first filtered display section is stored within the display cache, retrieve the first filtered display section from the display cache; and
      cause the first filtered display section to be displayed within the display area.

2. The computing device of claim 1, wherein the filter module is further configured to filter the first display section to create the first filtered display section if the data corresponding to the first filtered display section is determined to not be stored within the display cache.

3. The computing device of claim 2, wherein the display module is further configured to store the data corresponding to the created first filtered display section in the display cache.

4. The computing device of claim 3, wherein the display module is further configured to determine a fingerprint of the first filtered display section and store the fingerprint in the display cache.

5. The computing device of claim 1, wherein the display module is further configured to determine whether data corresponding to the first filtered display section is stored within the display cache by determining whether a fingerprint of the first display section is associated with the first filtered display section.

6. The computing device of claim 1, wherein the display module is further configured to determine whether data corresponding to the first filtered display section is stored within the display cache by determining whether a fingerprint of the first display section is associated with a fingerprint of the first filtered display section.

7. A method of displaying data, said method comprising:
  receive a prescription of a colorblind user;
  receiving a fingerprint of a display section, wherein the display section includes data to be displayed in a portion of a display area;
  determine, based on the fingerprint, that the display section is stored within a display cache;
  determining, by a processor, whether a filtered display section corresponding to the display section is stored within the display cache, the filtered display section compensates for colorblindness of the colorblind user viewing the display area based on the prescription of the colorblind user, wherein determining whether a filtered display section is stored within the display cache comprises determining whether a fingerprint of the display section is associated with a fingerprint of the filtered display section;
  receiving the filtered display section from the display cache if the filtered display section is determined to be stored within the display cache; and
  displaying the filtered display section within the display area.

8. The method of claim 7, further comprising filtering the display section to create a filtered display section if the filtered display section is determined to not be stored within the display cache.

9. The method of claim 8, further comprising storing the created filtered display section in the display cache.

10. The method of claim 9, further comprising:
  determining a fingerprint of the filtered display section; and
  storing the fingerprint in the display cache.

11. The method of claim 7, wherein determining whether a filtered display section is stored within the display cache comprises determining whether a fingerprint of the display section is associated with the filtered display section.

12. A non-transitory computer-readable storage medium having computer-executable instructions embodied thereon, wherein, when executed by a processor, the computer-executable instructions cause the processor to:
  receive a fingerprint of a display section, wherein the display section includes data to be displayed in a portion of a display area;
  receive a prescription of a colorblind user;
  determine, based on the fingerprint, that data corresponding to the display section is stored within the display cache;
  based on determining that data corresponding to the display section is stored within the display cache, determine whether the display section corresponds to a filtered display section that compensates for colorblindness of the colorblind user viewing the display area based on the prescription of the colorblind user;

when it is determined that the display section corresponds to a filtered display section, determine whether the filtered display section is stored within the display cache, when it is determined that the filtered display section is stored within the display cache, retrieve the filtered display section from the display cache;

determine whether a filtered display section is stored within the display cache by determining whether a fingerprint of the display section is associated with a fingerprint of the filtered display section; and cause the filtered display section to be displayed within the display area.

13. The non-transitory computer-readable storage medium of claim 12, wherein the computer-executable instructions further cause the processor to filter the display section to create a filtered display section if the filtered display section is determined to not be stored within the display cache.

14. The non-transitory computer-readable storage medium of claim 13, wherein the computer-executable instructions further cause the processor to store the created filtered display section in the display cache.

15. The non-transitory computer-readable storage medium of claim 14, wherein the computer-executable instructions further cause the processor to:
determine a fingerprint of the filtered display section; and
store the fingerprint in the display cache.

16. The non-transitory computer-readable storage medium of claim 12, wherein the computer-executable instructions further cause the processor to determine whether a filtered display section is stored within the display cache by determining whether a fingerprint of the display section is associated with the filtered display section.

17. A method of simulating a prescription lens within a computing device, the method comprising:
receiving, by a processor, prescription data of a colorblind user, wherein the prescription data includes data representative of at least one color to be changed within a display area to compensate for colorblindness of the colorblind user viewing the display area;
determining that data corresponding to the display area is stored within a display cache;
determining that the display area is subject to the prescription data;
based on determining that data corresponding to the display area is stored within the display cache and is subject to the prescription data, determining that data corresponding to the display area being filtered using the prescription data is not stored within the display cache;
based on the determination that data corresponding to the filtered display area is not stored within the display cache, selecting, by the processor, a filter that compensates for colorblindness of the colorblind user viewing the display area based on the prescription data;
selecting a portion of the display area to be filtered using the filter;
receiving a display section that corresponds to the portion of the display area;
filtering the display section using the filter to create a filtered display section; and
displaying the filtered display section within the portion of the display area.

18. The method of claim 17, further comprising storing the display section within a first display cache.

19. The method of claim 18, further comprising storing the filtered display section within the display cache.

20. The method of claim 19, further comprising associating the display section with the filtered display section.

21. The method of claim 19, further comprising:
generating a fingerprint of the display section; and
storing the fingerprint of the display section in an index of the first display cache.

22. The method of claim 21, further comprising storing the fingerprint of the display section in an index of the display cache.

23. The method of claim 22, further comprising associating the fingerprint of the display section with the filtered display section.

* * * * *